US012047298B2

(12) United States Patent
Karunakaran et al.

(10) Patent No.: US 12,047,298 B2
(45) Date of Patent: **\*Jul. 23, 2024**

(54) MULTICAST ROUTING THROUGH MULTI-TIER EDGE GATEWAYS

(71) Applicant: VMware, Inc., Palo Alto, CA (US)

(72) Inventors: Senthilkumar Karunakaran, Santa Clara, CA (US); Chidambareswaran Raman, Campbell, CA (US); Meenakshi Sundaram Selvaraj, Pleasanton, CA (US); Subin Cyriac Mathew, San Jose, CA (US); Stephen Tan, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,686

(22) Filed: Apr. 12, 2023

(65) Prior Publication Data

US 2023/0246968 A1    Aug. 3, 2023

Related U.S. Application Data

(63) Continuation of application No. 17/365,785, filed on Jul. 1, 2021, now Pat. No. 11,652,748.

(51) Int. Cl.
*H04L 47/125* (2022.01)
*H04L 12/46* (2006.01)
*H04L 47/193* (2022.01)
*H04L 47/80* (2022.01)

(52) U.S. Cl.
CPC ........ *H04L 47/125* (2013.01); *H04L 12/4633* (2013.01); *H04L 47/193* (2013.01); *H04L 47/806* (2013.01)

(58) Field of Classification Search
CPC . H04L 47/125; H04L 12/4633; H04L 47/193; H04L 47/806
See application file for complete search history.

(56) References Cited

U.S. PATENT DOCUMENTS

| | | | |
|---|---|---|---|
| 10,003,534 B2 | 6/2018 | Thakkar et al. | |
| 10,367,757 B2 | 7/2019 | Chandrashekhar et al. | |
| 10,503,565 B2* | 12/2019 | Guo | H04L 12/18 |
| 10,904,134 B2* | 1/2021 | Jiang | H04L 69/22 |
| 10,979,246 B2* | 4/2021 | Boutros | H04L 45/16 |
| 2013/0201986 A1 | 8/2013 | Sajassi et al. | |
| 2014/0192804 A1 | 7/2014 | Ghanwani et al. | |

(Continued)

*Primary Examiner* — Mohamed A. Wasel
(74) *Attorney, Agent, or Firm* — Kim & Stewart LLP

(57) ABSTRACT

A method of transmitting multicast traffic to workloads of tenants communicating over overlay networks provisioned on top of a physical network includes the steps of: detecting the multicast traffic; determining that the multicast traffic is bound for workloads of a first tenant and workloads of a second tenant; encapsulating one instance of the multicast traffic using a Layer 2 (L2) over Layer 3 (L3) encapsulation protocol to generate encapsulated traffic, wherein the encapsulated traffic includes an identifier of a first backplane network corresponding to the first tenant and an identifier of a second backplane network corresponding to the second tenant in a header portion of each packet of the encapsulated traffic; and transmitting, to a first host computing device, the encapsulated traffic with the identifiers of the first and second overlay networks.

20 Claims, 5 Drawing Sheets

(56) References Cited

U.S. PATENT DOCUMENTS

| | | |
|---|---|---|
| 2015/0236871 A1 | 8/2015 | Kang |
| 2016/0142220 A1 | 5/2016 | Hao et al. |
| 2019/0020568 A1 | 1/2019 | Kommula et al. |
| 2021/0126866 A1 | 4/2021 | Mathew et al. |

* cited by examiner

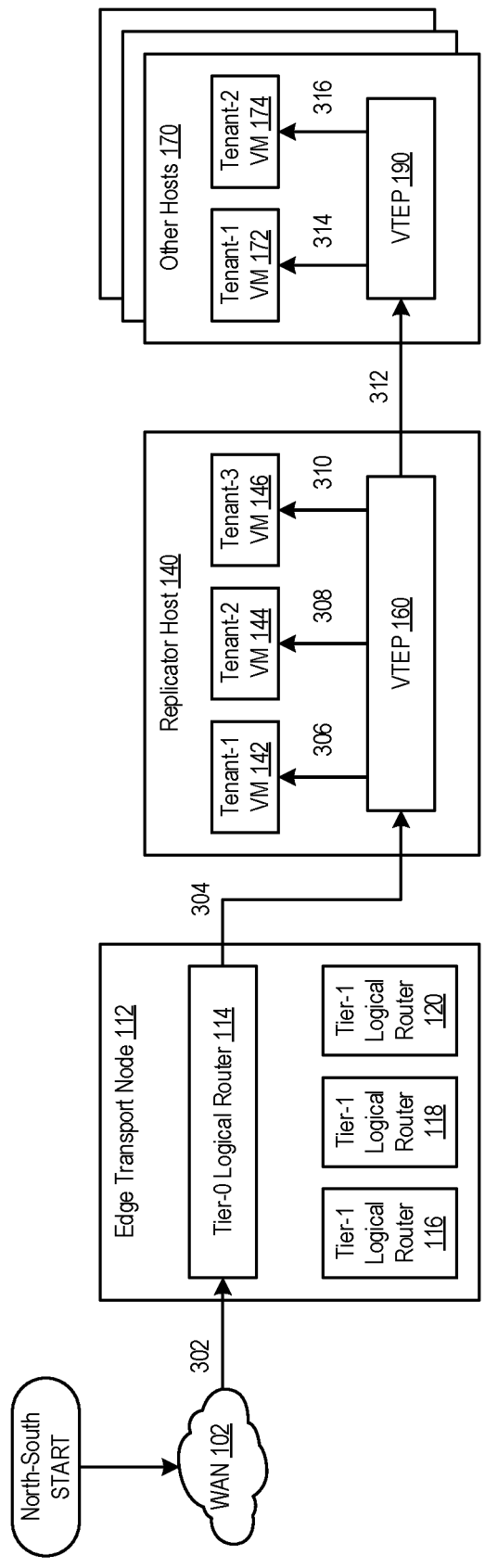

MULTICAST ROUTING THROUGH MULTI-TIER EDGE GATEWAYS

CROSS-REFERENCE TO RELATED APPLICATIONS

This application is a continuation of U.S. patent application Ser. No. 17/365,785, filed Jul. 1, 2021, published on Jan. 5, 2023 as U.S. Patent Publication No. 2023/0006932, which is incorporated by reference herein.

BACKGROUND

In a software-defined networking (SDN) environment, a multi-tier edge computing device, referred to herein as an "edge services gateway" (ESG), may act as a gateway between a physical network, e.g., a wide area network (WAN), and tenants of a software-defined datacenter (SDDC). Such tenants may be using, e.g., logical Layer 2 (L2) networks on top of a physical Layer 3 (L3) network, e.g., an internet protocol (IP) network. Packets transmitted across the logical L2 networks may be encapsulated according to an encapsulation protocol such as Geneve or Virtual Extensible LAN (VXLAN). In such an environment, the ESG may act as a source of multicast traffic by receiving traffic from the WAN and transmitting copies of the traffic to one or more host computing devices of the tenants. Such traffic is referred to as north-south traffic. On the other hand, a workload (e.g., virtual machine (VM), container, etc.) of one of the tenants may act as the source of multicast traffic by transmitting multicast traffic to the ESG, and the ESG may forward the traffic to one or more host computing devices in the same SDN environment. Such traffic is referred to as east-west traffic.

With both north-south and east-west traffic, the number of copies the ESG must transmit is dependent on the number of tenants with workloads the traffic is bound for. The ESG must transmit at least one copy of the traffic for each such tenant. However, packet replication is resource intensive and consumes limited downlink bandwidth of the ESG as well as additional uplink bandwidths of the host computing devices that run multiple tenant workloads. As a result, multicast traffic that is bound for workloads of a large number of tenants may experience high latency. A method for scaling up the throughput of multi-tiered ESGs to avoid high latency of multicast traffic is needed.

SUMMARY

Multicast traffic is forwarded to workloads of tenants communicating over overlay networks by detecting the multicast traffic and determining that the multicast traffic is bound for workloads of a first tenant and workloads of a second tenant, wherein the workloads of the first tenant communicate using a first overlay network and the workloads of the second tenant communicate using a second overlay network. One instance of the multicast traffic is encapsulated using an L2-over-L3 encapsulation protocol, and an identifier of a first backplane network corresponding to the first tenant and an identifier of a second backplane network corresponding to the second tenant are inserted into a header portion of the encapsulated traffic. The encapsulated traffic is then sent to a first host computing device which can then replicate the multicast traffic for the two tenants based on the inserted header information.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 2 is a simplified block diagram of multicast traffic in which type, length, and value fields are inserted into header fields of the traffic, according to embodiments.

FIG. 3A is a block diagram illustrating an example of transmitting north-south multicast traffic to VMs of a group of tenants, according to embodiments.

DETAILED DESCRIPTION

Figure 1:
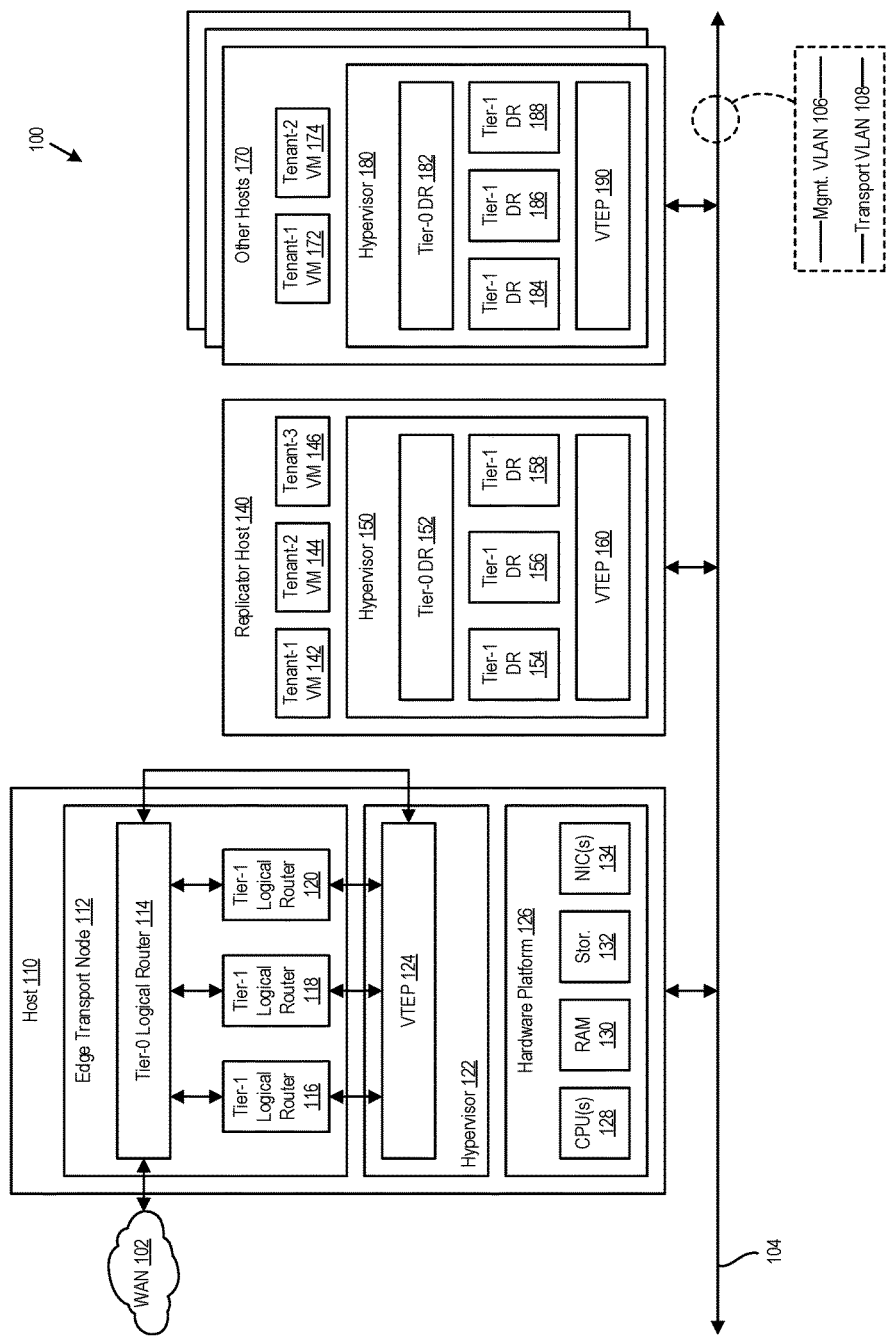
FIG. 1 is a block diagram of an SDDC including logical components for transmitting multicast traffic to VMs of a group of tenants, according to embodiments.

Techniques for scaling overlay multicast routing throughput on multi-tier ESGs are described. The techniques are performed in an SDDC having a logical (i.e., overlay) network platform. The logical network platform includes physical servers ("hosts"). Each host includes a virtualization layer, executing on a host hardware platform, which supports execution of VMs. A virtualization management server manages the hosts, the virtualization layers, and the VMs executing thereon.

An SDN layer of the SDDC may include a network manager and associated controllers, as well as software distributed among the virtualization layers of the hosts. In embodiments, one or more hosts comprise edge transport nodes that provide for ingress and egress of network traffic between the hosts and an external network (e.g., the public Internet or another WAN). Logical network services executing on the edge transport nodes include ESGs, which can be subdivided into tiers (e.g., Tier-0 gateways and Tier-1 gateways). Network traffic between the hosts and between the hosts and edge transport nodes traverses logical networks that are provisioned on top of a physical network. In embodiments, the logical networks provide L2-over-L3 tunnels through the physical network. Encapsulated L2-over-L3 traffic traverses a dedicated virtual local area network (VLAN) of the physical network. In alternate embodiments, a dedicated physical network, distinct from a physical network carrying management and/or other types of information such as storage, may be provided for overlay network traffic.

The SDDC may support logical L2 networks for multiple tenants. Each tenant includes a set of resources (e.g., VMs, logical L2 networks, and services) that is logically isolated from those of other tenants. In embodiments, an ESG routes IP multicast traffic for VMs of multiple tenants over corresponding logical L2 networks. One way to route multicast traffic is to transmit multiple copies of the multicast traffic, one for each tenant, from an ESG to a replicator host (e.g., a designated host for a tenant's multicast traffic). The virtualization layer in the replicator host then replicates and disperses copies of the multicast traffic to VMs of the tenant's logical L2 networks therein. The replicator host also forwards multiple copies of the multicast traffic to other hosts, one copy for each tenant.

Techniques described herein improve upon this process by transmitting only a single copy of the multicast traffic between the edge transport node and the replicator host, and between the replicator host and each other host. The techniques include inserting virtual network identifiers (VNIs) in a header portion of the encapsulated traffic, each VNI unique to a "backplane" logical network of a tenant with workloads for which the multicast traffic is bound. The virtualization layer in the replicator host parses the header portion to determine which backplane VNIs the encapsulated traffic corresponds to.

Based on the determined backplane VNIs, the virtualization layer routes the multicast traffic to the appropriate VMs on the associated tenants' logical L2 networks. Backplane logical networks will be discussed further below in conjunction with FIG. 1. The virtualization layer in the replicator host also forwards the encapsulated traffic to other hosts downstream, whose virtualization layers perform the same process of parsing the header portion and distributing the multicast traffic to the appropriate VMs. The described techniques substantially reduce network traffic and in turn conserve network resources, particularly as the number of tenants increases. These and further aspects of the techniques are described below with respect to the drawings.

Although embodiments discussed herein refer to VMs, it will be apparent that the invention may be used to provide tunnel-encapsulated traffic to other types of virtual workloads such as Kubernetes containers. Furthermore, this invention may be used to provide such traffic to nonvirtualized workloads. For example, if control agents and virtual switches are added to VMs, a network control system may directly apply SDN overlay networks and policies to the VMs without accessing the underlying hypervisors. Similarly, a control agent and virtual switch may be added to a host to apply an SDN overlay network and policies to a nonvirtualized workload therein. The application of SDN overlay networks and polices to VMs without accessing the underlying hypervisors is disclosed in U.S. Pat. No. 10,367,757, filed Aug. 31, 2016, the entire contents of which are incorporated herein by reference.

FIG. 1 is a block diagram of an SDDC 100 including logical components for transmitting multicast traffic to VMs of a group of tenants 1, 2, and 3. SDDC 100 includes a host 110, replicator host 140, and other hosts 170, which are connected by a physical IP network 104. SDDC 100 further includes a management VLAN 106 and a transport VLAN 108 provisioned on top of physical network 104. Management VLAN 106 is an overlay network that enables virtualization services for hosts 110, 140, and 170 such as configuring storage and networking resources of SDDC 100. Transport VLAN 108 is an overlay network that isolates encapsulated traffic of physical network 104 from non-encapsulated traffic of physical network 104. The encapsulated traffic of transport VLAN 108 employs L2-over-L3 encapsulation into logical L2 networks of tenants 1-3.

Hosts 110, 140, and 170 may be physical computer servers constructed on server grade hardware platforms 126 such as x86 architecture platforms (not shown in hosts 140 and 170). Each hardware platform 126 includes one or more central processing units (CPUs) 128, system memory such as random-access memory (RAM) 130, optional local storage 132 such as one or more hard disk drives (HDDs) or solid-state drives (SSDs), and one or more network interface cards (NICs) 134. CPU(s) 128 are configured to execute instructions, for example, executable instructions that perform one or more operations described herein, which may be stored in RAM 130. Local storage 132 in hosts 110, 140, and 170 may also optionally be aggregated and provisioned as a virtual storage area network (vSAN). NIC(s) 134 enable hosts 110, 140, and 170 to communicate with other devices over physical network 104.

Host 110 includes an edge transport node 112 and hypervisor 122. Hypervisor 122 is a virtualization layer that provides software abstraction of hardware resources to VMs executing on host 110. Hypervisor 122 includes a virtual tunnel endpoint (VTEP) 124 used for communicating over transport VLAN 108. For example, VTEP 124 may provide L2-over-L3 tunneling services for encapsulating egress packets from host 110 and decapsulating ingress packets to host 110.

Edge transport node 112 is a virtual server that manages the transmission and encapsulation of egress packets and internal routing of ingress packets. In the example of FIG. 1, edge transport node 112 comprises multiple tiers of logical entities, including a Tier-0 logical router (LR) 114 and Tier-1 LRs 116, 118, and 120. Tier-0 LR 114 is a gateway between a WAN 102 and Tier-1 LRs 116-118. Tier-1 LRs 116, 118, and 120 are gateways between Tier-0 LR 114 and logical L2 networks of tenants 1, 2, and 3, respectively. Although FIG. 1 shows a single edge transport node 112 having multiple tiers of LRs, it is also possible that each LR can be implemented in a different transport node.

Each LR contains a distributed router (DR) (not shown in host 110) that is also distributed across replicator host 140 and other hosts 170. Each tenant's VMs connect to the DRs to transmit and receive multicast traffic over the tenant's logical L2 networks. At host 110, Tier-0 LR 114 routes traffic to Tier-1 LRs 116-120, and the DRs of Tier-1 LRs 116-120 route traffic to VMs through logical switches (not shown) implemented by the hypervisors on respective hosts. The implementation of such DRs is further described in U.S. Pat. No. 10,003,534, filed Jan. 31, 2017, the entire contents of which are incorporated herein by reference.

Each LR also contains a service router (SR) (not shown) implemented in host 110. An SR is configured to provide services such as network address translation (NAT) that are not distributed. For each LR, the associated DR and SR within host 110 communicate over a "backplane" logical network. As used herein, the VNI assigned to such a backplane logical network is referred to as an LR's backplane VNI. When tier-0 LR 114 detects multicast traffic, the backplane VNIs of LRs connected to logical L2 networks for which the multicast traffic is bound can be learned. For example, such information can be learned from "join" requests received from VMs interested in joining a multicast group. The DRs connected to the VMs may forward such join requests to SRs over backplane logical networks to provide the information to edge transport node 112. This information can also be learned from a control plane (not shown).

Replicator host 140 includes a hypervisor 150 for supporting VMs 142, 144, and 146 of tenants 1, 2, and 3, respectively. Hypervisor 150 includes a VTEP 160 for communicating over transport VLAN 108. Hypervisor 150 also includes a Tier-0 DR 152 and Tier-1 DRs 154, 156, and 158 for replicating traffic and connecting to VMs of tenants 1-3 on replicator host 140. Tier-0 DR 152 is a logical component of Tier-0 LR 114, and Tier-1 DRs 154, 156, and 158 are logical components of Tier-1 LRs 116, 118, and 120, respectively.

In embodiments, Tier-0 LR 114 and Tier-1 LRs 116-120 transmit traffic to replicator host 140 by instructing VTEP 124 to encapsulate the traffic with header information including the IP and media access control (MAC) addresses of VTEP 124 as source addresses and the IP and MAC addresses of VTEP 160 as destination addresses. VTEP 124 then transmits the encapsulated traffic to VTEP 160 over physical network 104, VTEP 160 decapsulates the traffic, and the decapsulated traffic is routed to VMs on replicator host 140 for which the decapsulated traffic is bound. Similarly, VTEP 160 transmits traffic to VTEP 124 over physical network 104, VTEP 124 decapsulates the traffic, and the decapsulated traffic is routed to Tier-0 LR 114 or to one of Tier-1 LRs 116-120. In embodiments, the VTEPs use an L2-over-L3 encapsulation protocol, such as Geneve. As used herein, logical L2 networks for which traffic is bound are referred to as "interested" logical networks, and VMs on such interested logical networks are referred to as "interested" VMs.

In the embodiment shown in FIG. 1, edge transport node 112 transmits multicast traffic to the VMs of tenants 1-3 by offloading the replication function to host 140. In addition to providing copies of multicast traffic to VMs 142-146, replicator host 140 replicates and forwards the multicast traffic to other hosts 170. Such offloading of replication of multicast traffic reduces network congestion at host 110. However, in other embodiments, host 110 may transmit copies of multicast traffic directly to other hosts 170 without offloading replication. Additionally, for simplicity of illustration, in the example of FIG. 1, Tier-1 LRs 116-120 each select replicator host 140 for replicating and forwarding multicast traffic to other hosts 170. However, Tier-1 LRs 116-120 may each select a different host for replicating and forwarding multicast traffic based on factors such as the load on the different hosts. Offloading of replication and forwarding of multicast traffic is disclosed in U.S. Pat. No. 11,063,872, filed Oct. 24, 2019, the entire contents of which are incorporated herein by reference.

Other hosts 170 each include a hypervisor 180 for supporting VMs of tenants 1-3, including VMs 172 and 174 of tenants 1 and 2, respectively. Each hypervisor 180 includes a VTEP 190 for communicating over transport VLAN 108. Each hypervisor 180 also includes a Tier-0 DR 182 and Tier-1 DRs 184, 186, and 188 for replicating traffic and connecting to VMs of tenants 1-3 on other hosts 170. Tier-0 DR 182 is a logical component of Tier-0 LR 114, and Tier-1 DRs 184, 186, and 188 are logical components of Tier-1 LRs 116, 118, and 120, respectively. In embodiments, VTEP 160 forwards copies of traffic to other hosts 170, VTEPs 190 decapsulate the traffic, and the decapsulated traffic is routed to interested VMs on other hosts 170.

FIG. 2 is a simplified block diagram of multicast traffic in which type, length, and value (TLV) fields may be inserted into header fields of the traffic, according to embodiments. Multicast traffic includes a payload and other header fields indicating, e.g., source and destination IP addresses and source and destination MAC addresses. In embodiments, TLV fields are inserted to specify a list of backplane VNIs of LRs connected to interested logical networks. With tunneling protocols such as Geneve that provide option fields, the TLV fields may be inserted into such option fields. With other tunneling protocols that do not provide such option fields, the TLV fields may instead be inserted into reserved fields.

The entry of the "type of values" field indicates that the "values" field contains a replication list of backplane VNIs. The entry of the "length of values" field specifies, e.g., the total length of the "values" field. The "values" field stores a list of backplane VNIs, which may be encoded. The assignment and storage of backplane VNIs in TLV fields will be discussed further below in conjunction with FIG. 4A.

When replicator host 140 or other hosts 170 receive encapsulated traffic, the virtualization layers therein first parse TLV headers to determine which backplane VNIs the encapsulated traffic corresponds to. The virtualization layer on each host then selects the DRs that use the determined backplane VNIs. Finally, the selected DRs route the encapsulated traffic to interested VMs on logical L2 networks that the respective DRs are connected to. The selected DRs route the encapsulated traffic using Internet Group Management Protocol (IGMP) snooping tables managed by the DRs.

Figure 3B:
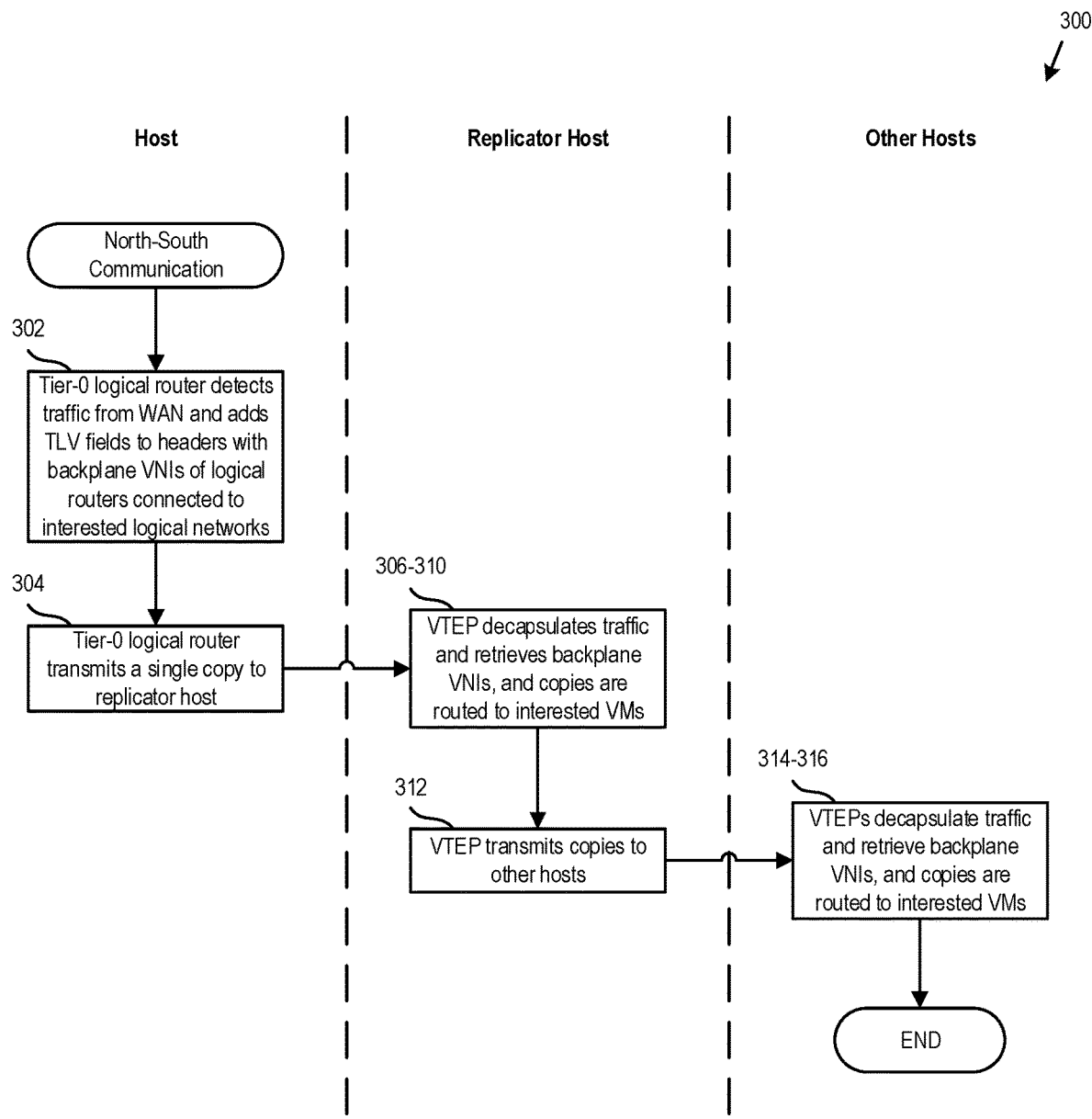
FIG. 3B is a flow diagram illustrating generalized steps carried out by a group of hosts to carry out a method of transmitting north-south multicast traffic to VMs of a group of tenants, according to embodiments.

FIG. 3A is a block diagram illustrating an example of transmitting north-south multicast traffic to the VMs of tenants 1-3, according to embodiments. FIG. 3B is a flow diagram illustrating generalized steps carried out by host 110, replicator host 140, and other hosts 170 to carry out a method 300 of transmitting north-south multicast traffic to VMs of a group of tenants, according to embodiments. FIGS. 3A and 3B will be discussed together.

At step 302, Tier-0 LR 114 detects multicast traffic received from a remote device (not shown) over WAN 102 and instructs VTEP 124 from FIG. 1 to encapsulate the traffic with TLV fields, a "value" field of the TLV fields including backplane VNIs of LRs connected to interested logical networks. In the example of FIG. 3A, the interested logical networks include all the logical L2 networks of tenants 1-3. At step 304, Tier-0 LR 114 transmits a single copy of the encapsulated traffic, with headers of each multicast packet including the VNI information, to VTEP 160.

Upon receiving the traffic, VTEP 160 parses the headers for a list of backplane VNIs, which may be used to determine a list of interested logical networks. In the example of FIG. 3A, VTEP 160 determines from backplane VNIs included in the traffic that the traffic is bound for VMs of the logical L2 networks of tenants 1-3. At steps 306, 308, and 310, VTEP 160 makes copies of the traffic, and copies are routed to interested VMs executing on replicator host 140.

At step 312, VTEP 160 transmits a single copy of the received traffic to each of other hosts 170 containing interested VMs. As mentioned earlier, the simplified embodiments described herein only include a single replicator host 140. However, in more complex embodiments with multiple replicator hosts, each replicator host that receives multicast traffic may replicate and forward a single copy of the traffic to each of other hosts 170 containing interested VMs.

At steps 314 and 316, VTEPs 190 of other hosts 170 decapsulate received traffic and determine a list of interested logical networks based on the inserted backplane VNIs. Copies of the decapsulated traffic are then routed to interested VMs. In the example of FIG. 3A, VTEPs 190 determine that the traffic is bound for VMs of logical L2 networks of tenants 1-3. VTEP 190 thus makes copies of the decapsulated traffic, and copies are routed to tenant-1 VM 172 and tenant-2 VM 174. After step 316, method 300 ends.

In the example of FIG. 3A, providing each illustrated VM of tenants 1-3 with a copy of multicast traffic requires: (1) one copy of traffic on VTEP 124's downlink, (2) one copy on VTEP 160's uplink, (3) one copy on VTEP 160's downlink per other host 170 containing interested VMs. and (4) one copy on each VTEP 190's uplink. On the other hand, existing technology relies on generating and forwarding multiple copies of traffic for multiple tenants, including transmitting multiple copies of traffic to the same host for routing to VMs connected to different DRs. As the number of tenants with interested logical networks for north-south multicast traffic increases, embodiments may thus substantially reduce loads on hosts 110, 140, and 170, which improves the routing throughputs of each host.

Figure 4A:
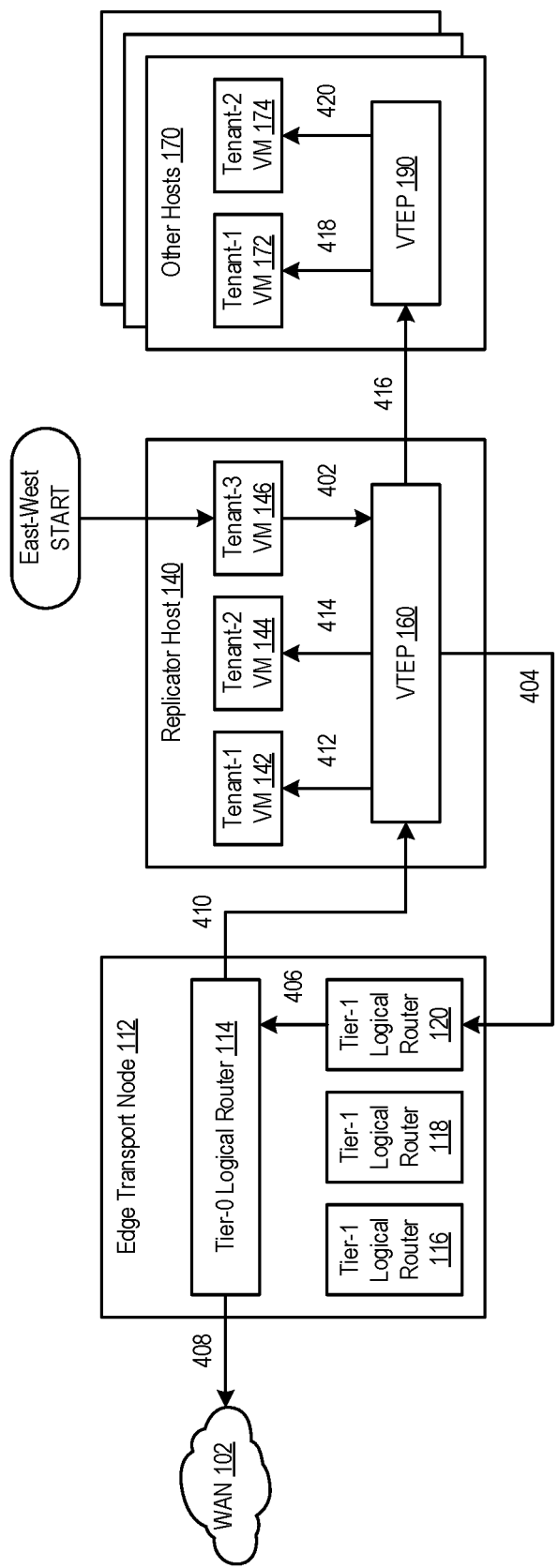
FIG. 4A is a block diagram illustrating an example of transmitting east-west multicast traffic to VMs of a group of tenants, according to embodiments.
Figure 4B:
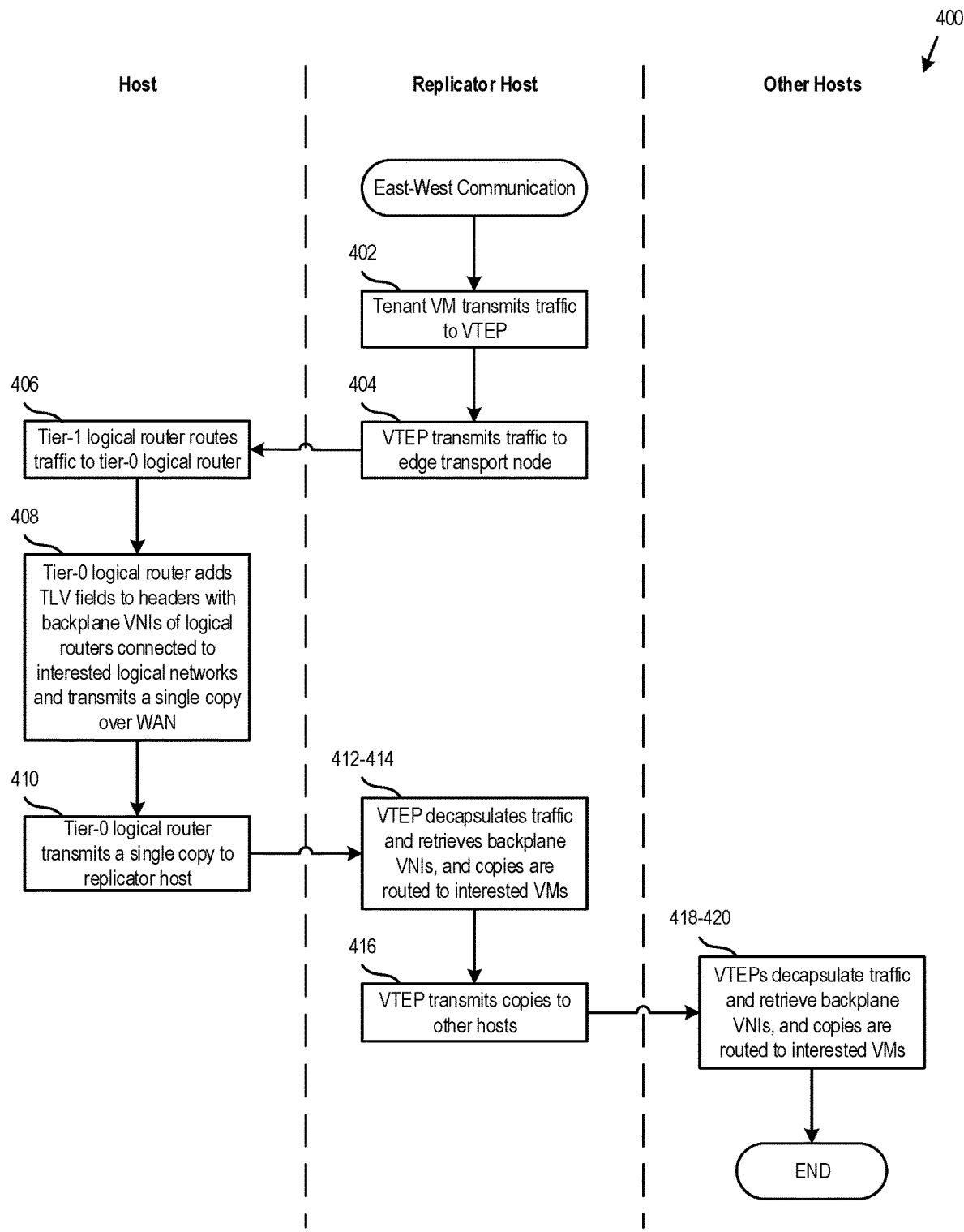
FIG. 4B is a flow diagram illustrating generalized steps carried out by a group of hosts to carry out a method of transmitting east-west multicast traffic to VMs of a group of tenants, according to embodiments.

FIG. 4A is a block diagram illustrating an example of transmitting east-west multicast traffic to the VMs of tenants 1 and 2, according to embodiments. FIG. 4B is a flow diagram illustrating generalized steps carried out by host 110, replicator host 140, and other hosts 170 to carry out a method 400 of transmitting east-west multicast traffic to VMs of a group of tenants, according to embodiments. FIGS. 4A and 4B will be discussed together.

At step 402, a VM of replicator host 140 transmits multicast traffic to VTEP 160. In the example of FIG. 4A, the source of the multicast traffic is tenant-3 VM 146. It should be noted that the source of the multicast traffic may also be a VM on another host. At step 404, VTEP 160 transmits the traffic to the Tier-1 LR corresponding to the tenant of the source VM. In the example of FIG. 4A, the corresponding Tier-1 LR is Tier-1 LR 120.

At step 406, the corresponding Tier-1 LR detects the multicast traffic and routes the multicast traffic to Tier-0 LR 114, instructing Tier-0 LR 114 to make copies of the traffic for routing to WAN 102 and to the VMs of interested logical networks. At step 408, upon receiving the multicast traffic. Tier-0 LR 114 instructs VTEP 124 from FIG. 1 to encapsulate the traffic with TLV fields, a "value" field of the TLV fields including backplane VNIs of LRs connected to interested logical networks. In the example of FIG. 4A, the interested logical networks include those of tenants 1 and 2. Tier-0 LR 114 also transmits the encapsulated traffic over WAN 102. At step 410, Tier-0 LR 114 transmits a single copy of the encapsulated traffic to VTEP 160.

Upon receiving the traffic, VTEP 160 parses the headers for a list of backplane VNIs, which may be used to determine a list of interested logical networks. In the example of FIG. 4A, VTEP 160 determines from backplane VNIs included in the traffic that the traffic is bound for VMs of logical L2 networks of tenants 1 and 2. At steps 412 and 414, VTEP 160 makes copies of the traffic, and copies are routed to interested VMs executing on replicator host 140.

At step 416, VTEP 160 transmits a single copy of the received traffic to each of other hosts 170 containing interested VMs. At steps 418 and 420, VTEPs 190 of other hosts 170 decapsulate received traffic and determine a list of interested logical networks based on the inserted backplane VNIs. Copies of the decapsulated traffic are then routed to interested VMs. In the example of FIG. 4A, VTEPs 190 determine that the traffic is bound for VMs of logical L2 networks of tenants 1-2. VTEP 190 thus makes copies of the decapsulated traffic, and copies are routed to tenant-1 VM 172 and tenant-2 VM 174. After step 420, method 400 ends.

In the example of FIG. 4A, providing each illustrated VM of tenants 1 and 2 with a copy of multicast traffic requires: (1) one copy of traffic on VTEP 124's uplink, (2) one copy on VTEP 124's downlink, (3) one copy on VTEP 160's uplink, (4) one copy on VTEP 160's downlink plus an additional copy per other host 170 containing interested VMs, and (5) one copy on each VTEP 190's uplink. As previously mentioned, existing technology transmits multiple copies of traffic to the same host for routing to VMs connected to different DRs. As the number of tenants with interested logical networks for east-west multicast traffic increases, embodiments may thus substantially reduce loads on hosts 110, 140, and 170, which improves the routing throughputs of each host.

In the example of FIG. 4A, in which multicast traffic is bound for logical L2 networks of tenants 1 and 2, the backplane logical networks of the Tier-1 LRs of tenants 1 and 2 may each be assigned a 3-bit VNI. For example, the backplane logical network of tenant 1's LR may be assigned the VNI "000" (binary), and the backplane logical network of tenant 2's LR may be assigned the VNI "001" (binary). The "length of values" field may thus store the value "6" (bits), and the "values" field may store the array "[000, 001]" to specify that traffic is bound for the logical L2 networks of tenants 1 and 2. However, in this simple example, the number of backplane VNIs that may be specified in the "values" field may be substantially limited by size constraints of packets because each additional backplane VNI requires the addition of 3 bits. It may thus be advantageous to use data compression to fit a large number of backplane VNIs into packets.

For example, run-length encoding (RLE) may be used to encode a list of backplane VNIs. In the example of FIG. 4A, the backplane logical networks of the Tier 1 LRs of tenants 1 and 2 may be assigned VNIs of "100" and "200" (decimal), respectively. Using RLE, the backplane logical network of tenant 1's Tier-1 LR may be encoded as a logical position in the "values" field by the decimal values "0", "0", "99", and "1" (in order). The repeating 0's indicate a "run" of repeating values, the number of repeating values specified by the next number. Here, the next number of "99" logically signifies 99 0's. The "1" after "99," which is not a repeating value, corresponds to the 100th logical position of the "values" field. The 100th logical position being set as a "1" indicates that traffic corresponds to the backplane VNI "100" and is thus bound for VMs of tenant 1's logical L2 networks. The decimal values "0", "0", "99", and "1" may then be repeated, logically signifying an additional 99 0's followed by a 1. The 200th logical position of the "values" field may thus be set as a "1," indicating that traffic also corresponds to the backplane VNI "200" and is thus also bound for VMs of tenant 2's logical L2 networks. Note that 20 bits are required to store the decimals values "0", "0", "99", "1" "0", "0", "99", and "1." However, as the number of backplane VNIs increases, a data compression method such as RLE allows for increasingly efficient storage of backplane VNIs.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest operating system (OS) that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of transmitting multicast traffic to workloads communicating over a plurality of logical networks provisioned over a physical network, the method comprising:
   receiving a multicast packet bound for both a first workload of a first logical network and a second workload of a second logical network, wherein the first and second logical networks are of the plurality of logical networks and are logically isolated from each other;
   encapsulating the received multicast packet using a Layer 2 (L2) over Layer 3 (L3) encapsulation protocol to generate an encapsulated packet, wherein the encapsulating comprises adding a header portion that includes both a first identifier related to the first logical network and a second identifier related to the second logical network; and
   transmitting, to a first host computing device, the encapsulated packet with the first and second identifiers.

2. The method of claim 1, wherein the multicast packet is received by a first gateway connected to a wide area network (WAN) that is separate from the physical network, the first gateway being separate from: (1) a second gateway connected between the first gateway and the first logical network and (2) a third gateway connected between the first gateway and the second logical network.

3. The method of claim 2, wherein the multicast packet is received by the first gateway from a remote computing device over the WAN.

4. The method of claim 1, wherein the multicast packet is received by a first gateway from a third workload executing on the first host computing device, the first gateway being connected between a second gateway and a third logical network, and the second gateway being connected to a wide area network (WAN) that is separate from the physical network.

5. The method of claim 1, wherein the first and second identifiers included by the header portion of the encapsulated packet are encoded according to a data compression method.

6. The method of claim 1, further comprising:
   determining, by the first host computing device, that the encapsulated packet is bound for the first and second workloads based on the first and second identifiers in the encapsulated packet; and
   providing, by the first host computing device, a first copy of the encapsulated packet to the first workload, which is executing on the first host computing device, and a second copy of the encapsulated packet to the second workload, which is executing on the first host computing device.

7. The method of claim 1, further comprising:
   transmitting, by the first host computing device, the encapsulated packet with the first and second identifiers to a second host computing device.

8. A non-transitory computer-readable medium comprising instructions that are executable in a computer system, wherein the instructions when executed cause the computer system to carry out a method of transmitting multicast traffic to workloads communicating over a plurality of logical networks provisioned over a physical network, the method comprising:
   receiving a multicast packet bound for both a first workload of a first logical network and a second workload of a second logical network, wherein the first and second logical networks are of the plurality of logical networks and are logically isolated from each other;
   encapsulating the received multicast packet using a Layer 2 (L2) over Layer 3 (L3) encapsulation protocol to generate an encapsulated packet, wherein the encapsulating comprises adding a header portion that includes both a first identifier related to the first logical network and a second identifier related to the second logical network; and
   transmitting, to a first host computing device, the encapsulated packet with the first and second identifiers.

9. The non-transitory computer-readable medium of claim 8, wherein the multicast packet is received by a first gateway connected to a wide area network (WAN) that is separate from the physical network, the first gateway being separate from: (1) a second gateway connected between the first gateway and the first logical network and (2) a third gateway connected between the first gateway and the second logical network.

10. The non-transitory computer-readable medium of claim 9, wherein the multicast packet is received by the first gateway from a remote computing device over the WAN.

11. The non-transitory computer-readable medium of claim 8, wherein the multi cast packet is received by a first gateway from a third workload executing on the first host computing device, the first gateway being connected between a second gateway and a third logical network, and the second gateway being connected to a wide area network (WAN) that is separate from the physical network.

12. The non-transitory computer-readable medium of claim 8, wherein the first and second identifiers included by the header portion of the encapsulated packet are encoded according to a data compression method.

13. The non-transitory computer-readable medium of claim 8, wherein the method further comprises:
    determining, by the first host computing device, that the encapsulated packet is bound for the first and second workloads based on the first and second identifiers in the encapsulated packet; and
    providing, by the first host computing device, a first copy of the encapsulated packet to the first workload, which is executing on the first host computing device, and a second copy of the encapsulated packet to the second workload, which is executing on the first host computing device.

14. The non-transitory computer-readable medium of claim 8, wherein the method further comprises:
    transmitting, by the first host computing device, the encapsulated packet with the first and second identifiers to a second host computing device.

15. A computer system comprising:
    a first host computing device executing a first workload of a first logical network and a second workload of a second logical network, wherein the first and second logical networks are logically isolated from each other; and
    a second host computing device that is an edge computing device executing instructions to transmit multicast traffic to workloads communicating over a plurality of logical networks provisioned over a physical network, the first and second logical networks being of the plurality of logical networks, wherein the instructions cause the second host computing device to carry out a method comprising:
        receiving a multicast packet bound for both the first workload and the second workload;
        encapsulating the received multicast packet using a Layer 2 (L2) over Layer 3 (L3) encapsulation protocol to generate an encapsulated packet, wherein the encapsulating comprises adding a header portion that includes both a first identifier related to the first logical network and a second identifier related to the second logical network; and
        transmitting, to the first host computing device, the encapsulated packet with the first and second identifiers.

16. The computer system of claim 15, wherein the multicast packet is received by a first gateway of the second host computing device connected to a wide area network (WAN) that is separate from the physical network, the first gateway being separate from: (1) a second gateway of the second host computing device connected between the first gateway and the first logical network and (2) a third gateway of the second host computing device connected between the first gateway and the second logical network.

17. The computer system of claim 16, wherein the multicast packet is received by the first gateway from a remote computing device over the WAN.

18. The computer system of claim 15, Wherein the multicast packet is received by a first gateway of the second host computing device from a third workload executing on the first host computing device, the first gateway being connected between a second gateway of the second host computing device and a third logical network, and the second gateway being connected to a wide area network (WAN) that is separate from the physical network.

19. The computer system of claim 15, wherein the first and second identifiers included by the header portion of the encapsulated packet are encoded according to a data compression method.

20. The computer system of claim 15, wherein the first host computing device determines that the encapsulated packet is bound for the first and second workloads based on the first and second identifiers in the encapsulated packet, and wherein the first host computing device provides a first copy of the encapsulated packet to the first workload and a second copy of the encapsulated packet to the second workload.

* * * * *